(12) United States Patent
Choi

(10) Patent No.: US 10,996,872 B2
(45) Date of Patent: May 4, 2021

(54) MEMORY DEVICE AND MEMORY SYSTEM FOR DIRECT COMMUNICATION BETWEEN THE MEMORY DEVICES

(71) Applicant: Samsung Electronics Co., Ltd., Suwon-si (KR)

(72) Inventor: Young Geun Choi, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 24 days.

(21) Appl. No.: 16/411,664

(22) Filed: May 14, 2019

(65) Prior Publication Data

US 2020/0104060 A1    Apr. 2, 2020

(30) Foreign Application Priority Data

Sep. 28, 2018    (KR) ........................ 10-2018-0116119

(51) Int. Cl.
  *G06F 3/06*      (2006.01)
  *G06F 9/30*      (2018.01)
  *G06F 12/0804*   (2016.01)

(52) U.S. Cl.
  CPC .......... *G06F 3/0622* (2013.01); *G06F 3/0637* (2013.01); *G06F 3/0659* (2013.01); *G06F 3/0683* (2013.01); *G06F 9/3004* (2013.01); *G06F 9/3005* (2013.01); *G06F 12/0804* (2013.01); *G06F 2212/1052* (2013.01)

(58) Field of Classification Search
  CPC .... G06F 3/0622; G06F 3/0637; G06F 3/0659; G06F 3/0683; G06F 9/3004; G06F 9/3005; G06F 12/0804; G06F 2212/1052; G06F 13/14–378; G06F 15/785; G06F 15/7821; G06F 13/28; G06F 9/30043; G06F 9/3887; G06F 9/3455
  See application file for complete search history.

(56) References Cited

U.S. PATENT DOCUMENTS

| | | | | |
|---|---|---|---|---|
| 5,175,829 A | * | 12/1992 | Stumpf | ................. G06F 13/374 710/108 |
| 5,313,591 A | * | 5/1994 | Averill | ................. G06F 13/368 710/119 |
| 2005/0273649 A1 | | 12/2005 | Jung et al. | |
| 2008/0147932 A1 | | 6/2008 | Fukazawa et al. | |

(Continued)

FOREIGN PATENT DOCUMENTS

JP    2009-163394 A    7/2009

OTHER PUBLICATIONS

Sudiptadandapat. "Bus Arbitration in Computer Organization". GeeksforGeeks. Aug. 28, 2018. <https://www.geeksforgeeks.org/bus-arbitration-in-computer-organization/>. (Year: 2018).*

*Primary Examiner* — Charles Rones
*Assistant Examiner* — Hewy H Li
(74) *Attorney, Agent, or Firm* — Harness, Dickey & Pierce, P.L.C.

(57) ABSTRACT

Provided are a memory device and a memory system. A memory device which is connected to the channel, comprises a memory cell array and a memory-authority control unit which controls operational authority of the channel, wherein the memory device controls data flow of other memory device connected to the channel, when the memory-authority control unit has the operational authority of the channel.

16 Claims, 17 Drawing Sheets

(56) References Cited

U.S. PATENT DOCUMENTS

| | | |
|---|---|---|
| 2011/0126066 A1 | 5/2011 | Jo et al. |
| 2012/0324171 A1 | 12/2012 | Benhase et al. |
| 2013/0275631 A1 | 10/2013 | Magro et al. |
| 2014/0136811 A1* | 5/2014 | Fleischer .............. G06F 15/785 |
| | | 711/207 |
| 2017/0263306 A1 | 9/2017 | Murphy |
| 2017/0286003 A1* | 10/2017 | Sala ...................... G06F 3/0641 |
| 2020/0241803 A1* | 7/2020 | Lea ....................... G06F 3/0673 |

* cited by examiner

FIG. 8

Instructions
1. Read 1st MD 2nd Page
2. Write 1st MD 4th Page
3. Read 2nd MD 3rd Page
4. Write 1st MD 5th Page
5. Read 3rd MD 1st Page
6. Write 1st MD 6th Page
7. Erase 1st MD 1st Block
8. Erase 2nd MD 1st Block
9. Erase 3rd MD 1st Block

MEMORY DEVICE AND MEMORY SYSTEM FOR DIRECT COMMUNICATION BETWEEN THE MEMORY DEVICES

CROSS-REFERENCE TO RELATED APPLICATION

This application claims the benefit of Korean Patent Application No. 10-2018-0116119, filed on Sep. 28, 2018, in the Korean Intellectual Property Office, the disclosure of which is incorporated herein in its entirety by reference.

BACKGROUND

1. Field of the Disclosure

The present disclosure relates to a memory system and a memory device for direct communication with the memory devices.

2. Description of the Related Art

The memory system may include, for example, memory devices, channels and/or a host device. The memory devices may be connected to the host device via the channel.

In the memory system, the host device may completely control the memory devices. That is, the memory devices may completely operate as a slave of the host device.

The memory device may also include additional processing units such as a memory processor (processor in memory (PIM)). The memory processor may process data in the memory device including the memory processor.

That is, if the memory device includes a memory processor, the data in the memory device may be processed by the host device or processed by the memory processor in the memory device.

On the other hand, when a series of instructions are processed by the memory processor of the memory device, not only data in the memory device including the memory processor, but also data of other memory devices connected to the channel may be required. At this time, since the memory devices completely operate as a slave of the host device, the memory processor may request the host device for the data of the other memory device. In other words, if there is a data movement request between the memory devices, intervention of the host device may be relied upon.

When the data movement request between the memory devices frequently occurs, the burden on the host device may be gradually expanded. In this way, when the host device seizes the channel of the memory system to control the data flow of all the memory devices connected to the channel, a burden on the host device may be caused. The burden on the host device may hinder the operational efficiency of the memory system.

SUMMARY

Example embodiments of the present disclosure provide a memory system and a memory device which increase the operational efficiency of the memory system.

However, example embodiments of the present disclosure are not restricted to the ones set forth herein. The above and other example embodiments of the present disclosure will become more apparent to one of ordinary skill in the art to which the present disclosure pertains by referencing the detailed description of the present disclosure given below.

According to some example embodiments of the present disclosure, there is provided a memory device which is connected to the channel, comprising a memory cell array, a memory processor with a memory-authority control unit configured to control operational authority of the channel, wherein the memory processor is configured to control data flow of other memory devices connected to the channel, when the memory-authority control unit has the operational authority of the channel.

According to some example embodiments of the present disclosure, there is provided a memory system comprising a host device which is connected to the channel and comprises a core processor with a host-authority control unit configured to control operational authority of the channel, wherein the core processor is configured to block a data flow to the channel from the host device, when the host-authority control unit has no operational authority of the channel.

According to some example embodiments of the present disclosure, there is provided a memory system comprising a host device which is connected to each of a first channel and a second channel which is different from the first channel, and includes a core processor with a host-authority control unit configured to control operational authority of the first and second channels; first and second memory devices connected to the first channel; and a third memory device connected to the second channel, wherein the host-authority control unit is configured to grant operational authority of the first channel to the first memory device, and the first memory device includes a memory processor configured to directly request the second memory device for data, and the host-authority control unit is further configured to grant no operational authority of the second channel to the third memory device.

BRIEF DESCRIPTION OF THE DRAWINGS

The above and other aspects and features of the present disclosure will become more apparent by describing in detail example embodiments thereof with reference to the attached drawings, in which:

FIG. 8 is a diagram illustrating an instruction for executing the garbage collection operation according to some example embodiments of the present application;

DETAILED DESCRIPTION

Figure 1:
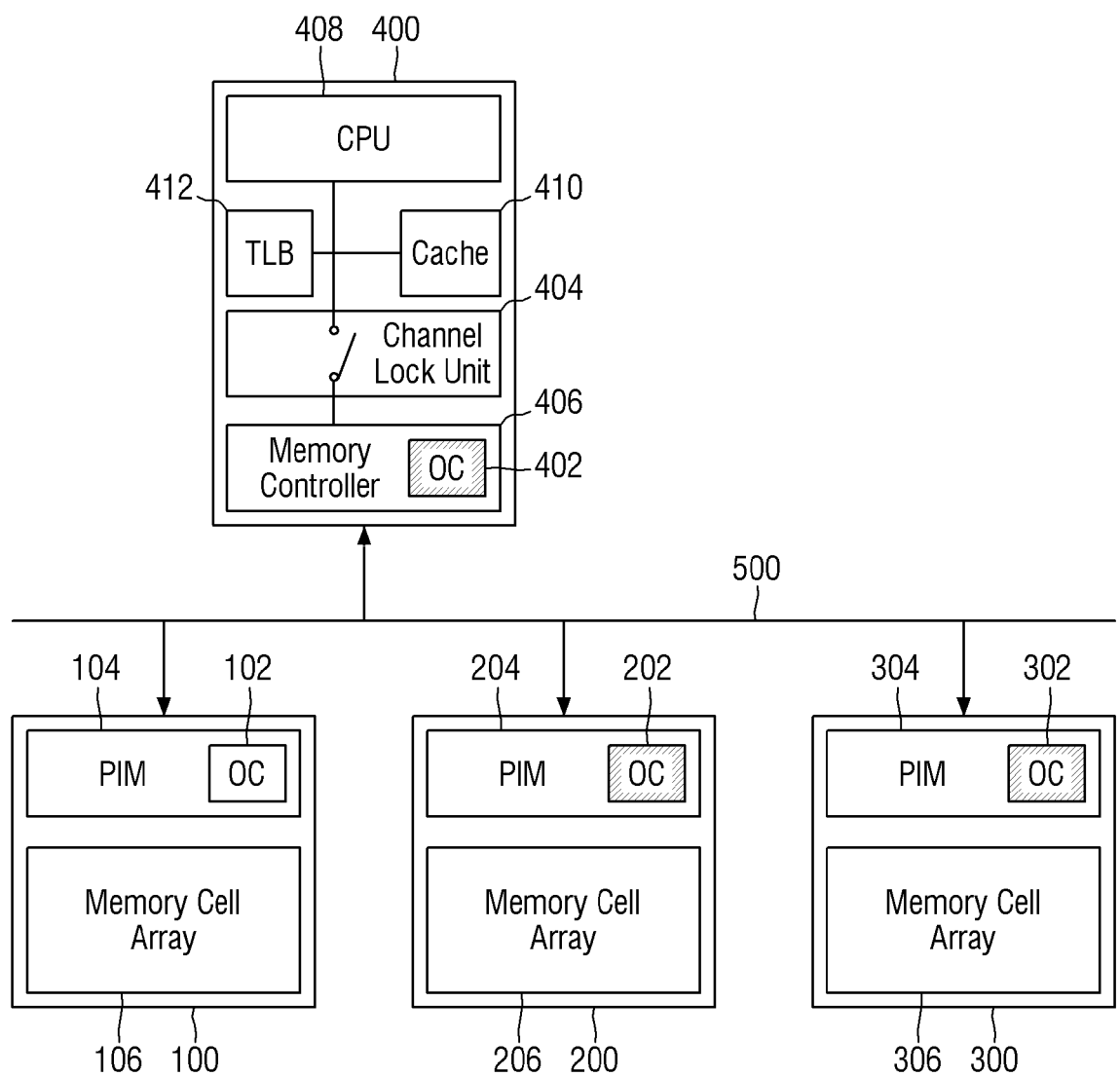
FIG. 1 is a block diagram of a memory system according to some example embodiments of the present application.

Advantages and features of the present disclosure and methods of accomplishing the same may be understood more readily by reference to the following detailed description of example embodiments and the accompanying drawings. The present disclosure may, however, be embodied in many different forms and should not be construed as being limited to the example embodiments set forth herein. Rather, these example embodiments are provided so that this disclosure will be thorough and complete and will fully convey the concepts of the disclosure to those skilled in the art, and the present disclosure will only be defined by the appended claims. In the drawings, sizes and relative sizes of the constituents illustrated in the drawings may be exaggerated for clarity of explanation. The same reference numerals refer to the same constituent elements throughout the specification, and the term "and/or" includes each of the mentioned items and one or more combinations.

The terms used in the present specification are for the purpose of illustrating the example embodiments and do not limit the present disclosure. As used herein, the singular form also includes the plural forms unless specifically stated. The terms "comprises" and/or "comprising" used in the specification do not exclude the presence or addition of one or more other constituent elements, in addition to the referenced constituent elements.

Although the terms "first," "second," and "the like" are used to describe various elements or constituent elements, these elements or constituent elements are not limited by these terms. These terms are merely used to distinguish one constituent element from other constituent elements. Therefore, it is a matter of course that the first element or constituent element described below may be a second element or constituent element within the technical idea of the present disclosure.

Unless otherwise defined, all terms (including technical and scientific terms) used in this specification may be used in the meaning that can be understood in common by those having ordinary skill in the technical field to which the present disclosure belongs. Also, the commonly used terms defined by a dictionary are not interpreted ideally or unduly, unless expressly defined otherwise.

FIG. 1 is a block diagram of a memory system according to some example embodiments of the present application.

The memory system according to some example embodiments of the present application may include a first memory device 100, a second memory device 200, a third memory device 300, a host device 400, and/or a channel 500.

Each of the first to third memory devices 100, 200 and 300 may include first to third memory-authority control units 102, 202 and 302, first to third memory processors 104, 204 and 206, and/or first to third memory cell arrays 106, 206 and 306. Each of the first to third memory devices 100, 200 and 300 may be connected to the host device 400 through a channel 500. In some example embodiments, the memory devices 100, 200 and/or 300 may be implemented as a volatile memory device or a non-volatile memory device. In some example embodiments, the memory devices 100, 200 and/or 300 may be configured as a storage class memory device.

In some example embodiments, the memory-authority control units 102, 202 and/or 302 may exclusively have operational authority of the channel 500. For example, when the first memory-authority control unit 102 has operational authority of the channel 500, the second and/or third memory devices 200 and 300 connected to the channel 500, and/or the host device 400 may not have operational authority of the channel 500.

The memory-authority control units 102, 202 and/or 302 may be a separate configuration in the respective memory devices 100, 200 and/or 300. For example, the first memory-authority control unit 102 may be implemented as a separate IC chip in the memory device 100.

In some example embodiments, the memory-authority control units 102, 202 and/or 302 may be a configuration included in the memory processors 104, 204 and/or 304. For example, the first memory-authority control unit 102 may be implemented as a separate IC chip in the first memory processor 104.

In some example embodiments, the memory-authority control units 102, 202 and/or 302 may be included in the respective memory processors 104, 204 and/or 304. For example, the first memory-authority control unit 102 may be implemented as software that is executed on the first memory processor 104.

In some example embodiments, all the memory devices 100, 200 and/or 300 do not need to include a memory-authority control unit in the memory system. That is, for example, only the first memory device 100 may include the first memory-authority control unit 100, and the second memory device 200 and/or the third memory device 300 may not include a memory-authority control unit 202 and/or 302. However, the example embodiments are not limited thereto.

In some example embodiments, the first memory processor 104 may execute a series of instructions for the second and/or third memory device 200, 300 connected to the memory device 100 and/or the channel 500. The first memory processor 104 may execute control-instructions for controlling the data flow of the second and/or third memory device 200, 300. In some example embodiments, the control-instructions for controlling the data flow of the second and/or third memory device 200, 300 may include reading, writing and/or erasing of data of the second and/or third memory cell array 206, 306 of the second and/or third memory device 200, 300.

In some example embodiments, the second memory processor 204 and/or the third memory processor 304 may perform the same function as the first memory processor 104. However, the second memory processor 204 and/or the third memory processor 304 does not always need to perform the same function as the first memory processor 104.

The memory processors 104, 204 and/or 304 may be implemented as separate configurations in the memory devices 100, 200 and/or 300. In some example embodiments, the memory processors 104, 204 and/or 304 may be implemented as a separate IC chip in the memory devices 100, 200 and/or 300.

In some example embodiments, some memory devices in the memory system may not include the memory processor. That is, for example, only the first memory device 100 may include the first memory processor 104, and the second memory device 200 and/or the third memory device 300 may not include the memory processor. However, the example embodiments are not limited thereto.

The memory cell arrays 106, 206 and/or 306 of the memory devices 100, 200 and/or 300 may include a plurality of memory cells that stores data. In some example embodiments, the range of memory cells to which the read, write, and/or erase operation in the memory cell arrays 106, 206 and/or 306 is applied may vary. In some example embodiments, the memory cell arrays 106, 206 and/or 306 may include a block including a plurality of memory cells. Each of the blocks may include pages including a plurality of memory cells. At this time, the data may be read and/or written in page units and may be erased in block units.

The first memory processor 104 of the first memory device 100 may include, for example, a memory address table including at least one data address among the first to third memory cell arrays 106. When the data addresses of the first to third memory cell arrays 106, 206 and/or 306 are changed with execution of a series of instructions by the first memory processor 104, the first memory processor 104 may update the memory address table.

The memory address table may be implemented as a separate configuration in the memory processor 104. For example, the memory address table may be implemented as a separate IC chip in the memory processor 104. The memory address table may be implemented as a part of the memory processor 104. For example, the memory address table may be implemented as software running on the memory processor 104.

The host device 400 includes a host-authority control unit (ownership controller: OC) 402, a channel lock unit 404, a memory controller 406, a core processor (CPU) 408, a cache 410, and a translation lookaside buffer (TLB) 412.

The host-authority control unit 402 may have operational authority of the channel 500. If the host-authority control unit 402 has the operational authority of the channel 500, the first to third memory-authority control units 100, 200 and 300 of the memory devices 100, 200 and 300 connected to the channels 102, 202 and 303 may not have the operational authority of the channel.

In some example embodiments, the host-authority control unit 402 may be configured as an independent unit in the host device 400. For example, host-authority control unit 402 may include the independent IC chips. In some example embodiments, the host-authority control unit 402 may be a separate configuration included in the memory controller 406. For example, the host-authority control unit 402 may be configured by separate IC chips within the memory controller 406. In some example embodiments, the host-authority control unit 402 may be included in the memory controller 406. For example, the host-authority control unit 402 may be implemented as software running on the memory controller 406.

The channel lock unit 404 of the host device 400 may set a lock for blocking the data flow from the host device 400 to the channel 500. The channel lock unit 404 may set a lock between the core processor 408 and the memory controller 406 to block a data request or a series of instructions from the core processor 408 of the host device 400 to the memory controller 406.

In some example embodiments, the channel lock unit 404 may set a lock, using a semaphore. In some example embodiments, the channel lock unit 404 may be configured as an independent unit in the host device 400. For example, the channel lock unit 404 may be configured as an independent IC chip. In some example embodiments, the channel lock unit 404 may be a separate configuration included in the memory controller 406. For example, the channel lock unit 404 may be constituted as separate IC chips within the memory controller 406. In some example embodiments, the channel lock unit 404 may be included in the memory controller 406. For example, the channel lock unit 404 may be implemented as software running on the memory controller 406.

The memory controller 406 of the host device 400 may control the data flow of the memory devices 100, 200 and/or 300 connected to the channel 500. When the host device 400 does not have the operational authority of the channel 500, the memory controller 406 may not control the data flow of the memory devices 100, 200 and/or 300 connected to the channel 500. The memory controller 406 of the host device 400 may be constituted as an independent unit in the host device 400. For example, the memory controller 406 may be constituted as an independent IC chip.

The core processor 408 of the host device 400 may execute a series of instructions of the memory devices 100, 200 and/or 300 connected to the channel 500. The core processor 408 may transmit a series of instructions of the memory devices 100, 200 and/or 300 connected to the channel 500 to the memory processors 104, 204 and/or 304 of the memory devices 100, 200 and/or 300. When the lock is set by the channel lock unit 404 of the host device 400, the core processor 408 may process tasks other than executing a series of instructions of the memory devices 100, 200 and/or 300 connected to the channel 500. For example, when the host-authority control unit 402 has the operational authority of the channel 500, the core processor 408 may directly execute a series of instructions for the memory devices 100, 200 and/or 300 connected to the channel 500, and may transmit a series of instructions to the memory processors 104, 204 and/or 304 of the memory devices 100, 200 and/or 300. In addition, the core processor 410 may be used to process other tasks when the lock is set by the channel lock unit 404 of the host device 400.

A cache 410 of the host device 400 may store a part of the data stored in the memory devices 100, 200 and/or 300 connected to the channel 500. The data stored in the cache 410 may be provided to the core processor 408 of the host device 400. When the lock is set by the channel lock part 404 of the host device 400, the cache 410 may be flushed.

A translation lookaside buffer (TLB) 412 of the host device 400 may include a memory address table including the data addresses of the memory cell arrays 106, 206 and/or 306 of the memory devices 100, 200 and/or 300 connected to the channel 500. The TLB 412 may convert the virtual memory address of the data into the physical memory address of the data. When the host device 400 receives the updated memory address table from the memory processors 104, 204 and/or 304 of the memory devices 100, 200 and/or 300 connected to the channel 500, the TLB 412 may update the memory address table.

For example, in FIG. 1, the TLB 412 of the host device 400 may include a memory address table including data addresses of the first to third memory cell arrays 106, 206 and/or 306. Also, the TLB 412 may update the memory address table, when the host device 400 receives the updated memory address table from the first memory processor 104.

Hereinafter, the memory cell array of the memory device will be described more specifically with reference to FIGS. 1 and 2.

Figure 2:
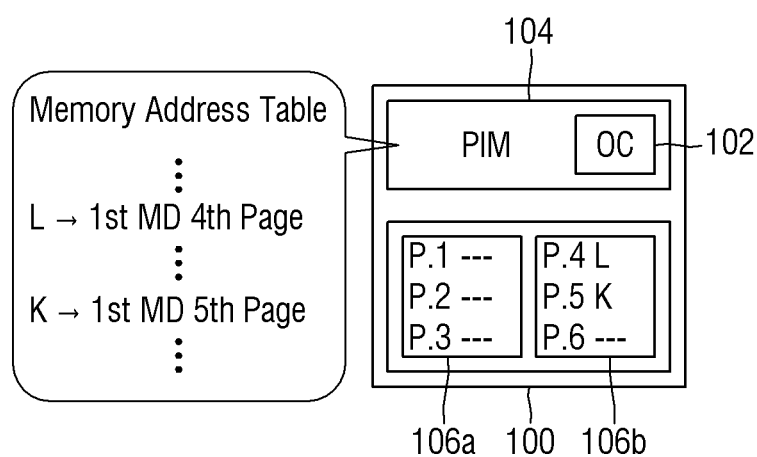
FIG. 2 is a block diagram of a memory device according to some example embodiments of the present application.

FIG. 2 is a block diagram of the memory device according to some example embodiments of the present application.

In FIG. 2, the first memory cell array 106 of the first memory device 100 may include a first block 106a including the first to third pages, and a second block 106b including fourth to sixth pages.

Referring to FIGS. 1 and 2, the first memory processor 104 may include a memory address table including at least one data address among the first to third memory cell arrays 106, 206 and 306 of the first to third memory devices 100, 200 and 300.

In the memory cell array 106 or 206, "---" and "XXX" stored in the page may indicate blank and garbage, respectively. In the memory cell arrays 106 and 206, alphabets (e.g., "L" or "K") among the data stored in the page may indicate specific data. Like the first memory device 100, the second and/or third memory cell arrays 206 and 306 may include a first block including first to third pages, and a second block including fourth to sixth pages.

Hereinafter, the operation of the memory device and the host device in the memory system will be described with reference to FIGS. 3 and 4.

Figure 3:
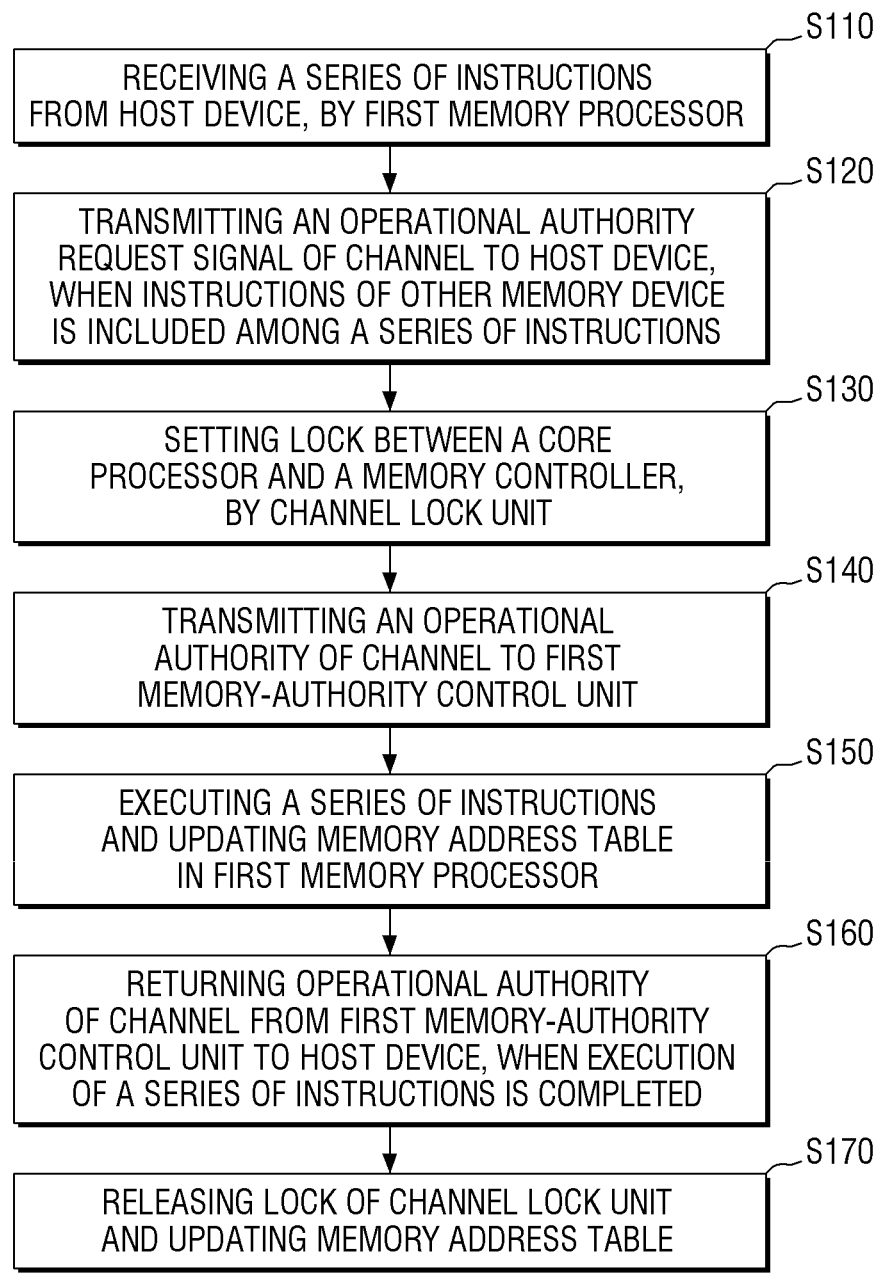
FIG. 3 is a flowchart illustrating operations of a memory device and a host device according to some example embodiments of the present application.

FIG. 3 is a flowchart illustrating operations of the memory device and the host device according to some example embodiments of the present application. FIG. 4 is a diagram illustrating the operations of S110 to S150 of FIG. 3.

Referring to FIG. 3, the first memory processor receives a series of instructions from the host device (S110). Specifically, for example, referring to FIG. 4, the memory processor 104 of the memory device 100 may receive a series of instructions from the core processor 408 of the host device 400 (S110). For example, the memory processor 104 may receive the following series of instructions from the core processor 408.

"Instructions:
1. Read Second Page of First Memory Device;
2. Write Fourth Page of First Memory Device;
3. Read Third Page of Second Memory Device;
4. Write Fifth Page of First Memory Device;
5. Erase First Block of first Memory Device;
6. Erase First Block of Second Memory Device, . . . "

Next, referring to FIG. 3, when the memory-authority control unit includes instructions of another memory device among a series of instructions, the memory-authority control unit may transmit an operational authority request signal of channel to the host device (S120). That is, the memory-authority control unit may determine whether or not instructions of another memory device are included among a series of instructions received by the memory processor. In addition, the memory-authority control unit may transmit the operational authority request signal of the channel to the host device on the basis of the aforementioned determination.

Figure 4:
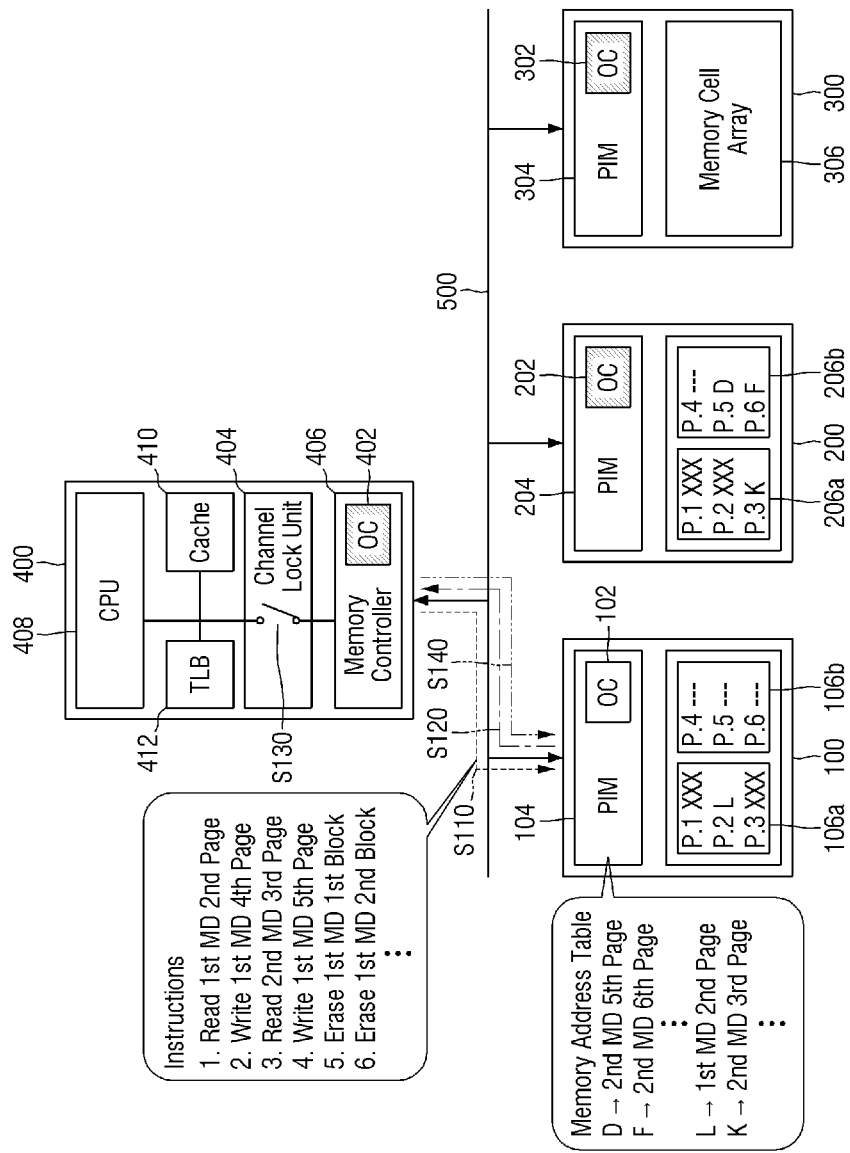
FIG. 4 is a diagram illustrating the operations of S110 to S150 of FIG. 3.

Specifically, referring to FIG. 4, for example, the memory-authority control unit 102 may determine whether a series of instructions received from the core processor 408 of the host device 400 includes instructions on the second and/or third memory device 200, 300 (for example, control-instructions for controlling the data flow of the second or third memory device 200, 300). The memory-authority control unit 102 may transmit the operational authority request signal of the channel 500 to the host device 400 in accordance with above determination (S120). For example, the memory-authority control unit 102 may transmit the operational authority request signal of the channel 500 to the host device 400, on the basis of the determination that a series of instructions received from the host device 400 includes instructions on the second memory device 200 (for example, "3. Read Third Page of Second Memory Device" or "6. Erase First Block of Second Memory Device").

Next, referring to FIG. 3, a lock may be set between the core processor and the memory controller by the channel lock unit (S130). Specifically, for example, referring to FIG. 4, when the host-authority control unit 402 of the host device 400 receives the operational authority request signal of the channel 500 from the memory-authority control unit 102 of the memory device 100, the channel lock unit 404 of the host device 400 may set a lock for blocking the data flow from the host device 400 to the channel 500 (S130). In some example embodiments, the channel lock unit 404 of the host device 400 may set a lock between the core processor 408 of the host device 400 and the memory controller 406.

Next, referring to FIG. 3, the host device may transmit the operational authority of the channel to the first memory-authority control unit (S140). Specifically, for example, referring to FIG. 4, the host-authority control unit 402 of the host device 400 may transmit the operational authority of the channel 500 to the memory-authority control unit 102 of the memory device 100 (S140). The memory-authority control unit 102 may have operational authority of the channel 500.

Next, referring to FIG. 3, a series of instructions may be executed in the first memory processor to update the memory address table (S150).

Specifically, for example, referring to FIG. 4, the memory processor 104 of the memory device 100 may execute a series of instructions received from the host device 400 (S150). The first memory processor 104 may execute instructions on the second and/or third memory devices 200 and/or 300 connected to the channel 500.

In some example embodiments, the first memory processor 104 may execute control-instructions for controlling the data flow of the second and/or third memory devices 200 and/or 300 connected to the channel 500. Further, when the data address of at least one of the first to third memory devices 100, 200 and 300 is changed with the execution of a series of instructions, the first memory processor 104 may update the memory address table.

FIG. 4 illustrates data of the first and second memory cell arrays 106 and 206, and the memory address table included in the first memory processor 104, before the memory processor 104 executes a series of instructions received from the host device 400. When the first memory processor 104 executes the instructions "3. Read Third Page of Second Memory Device" and "4. Write Fifth Page of First Memory Device", the address of the data "K" stored in the third page of the second memory cell array 206 is changed to the second page of the first memory cell array 106. Hereinafter, such an operation will be described in more detail referring to FIG. 5.

Figure 5:
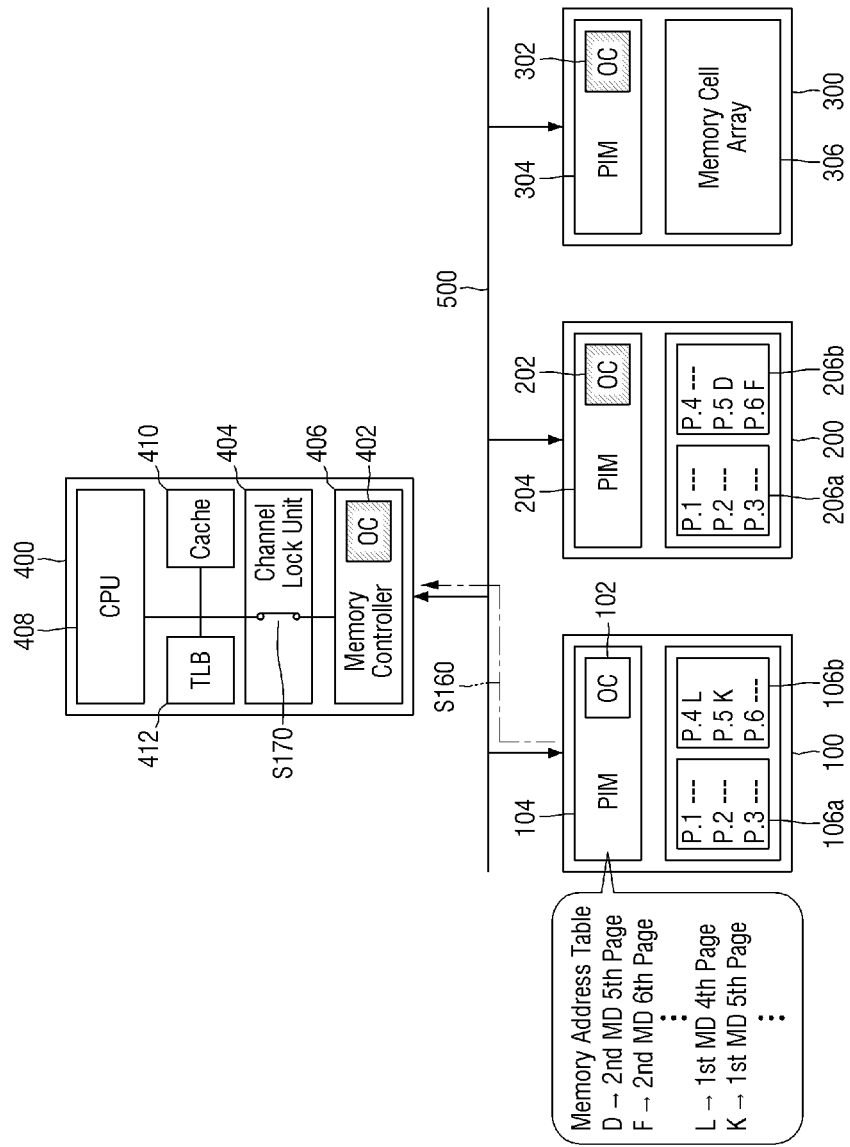
FIG. 5 is a diagram illustrating the operations of S160 and S170 of FIG. 3.

FIG. 5 is a diagram illustrating operations S150 to S170 of FIG. 3. FIG. 5 illustrates the first and second memory cell arrays 106 and 206, and the memory address table, after the memory processor 104 executes a series of instructions received from the host device 400. For example, when the instructions "3. Read Third Page of Second Memory Device" and "4. Write Second Page of First Memory Device" are executed in the first memory processor 104, the memory processor 104 updates the address of "K" of the memory address table from "the third page of the second memory device" to "the fifth page of the first memory device".

Referring again to FIG. 3, when the execution of a series of instructions in the memory processor is completed, the operational authority of the channel may be returned from the first memory-authority control unit to the host device (S160). Specifically, for example, referring to FIG. 5, the first memory-authority control unit 102 determines whether the first memory processor 104 executes all the series of instructions received from the host device 400. The first memory-authority control unit 102 may transmit the operational authority of the channel 500 to the host device 400 in accordance with the aforementioned determination. For example, the memory-authority control unit 102 may transmit the operational authority of the channel 500 to the host device 400, on the basis of the determination that all the series of instructions received from the host device 400 are executed.

Referring again to FIG. 3, the host device may release the lock of the channel lock unit and update the memory address table (S170). Specifically, for example, referring to FIG. 5, the host-authority control unit 402 of the host device 400 may receive the operational authority of the channel 500 from the memory-authority control unit 102 of the memory device 100. The channel lock unit 404 of the host device 400 may release the lock for blocking the data flow from the host device 400 to the channel 500. For example, the channel lock unit 404 of the host device 400 may release the lock between the core processor 408 of the host device 400 and the memory controller 406. The TLB 412 of the host device 400 may receive the memory address table updated from the memory processor 104 of the memory device 100. The TLB 412 of the host device 400 may update the memory address table.

Hereinafter, a memory system according to an embodiment of the present application will be described referring to FIG. 6.

Figure 6:
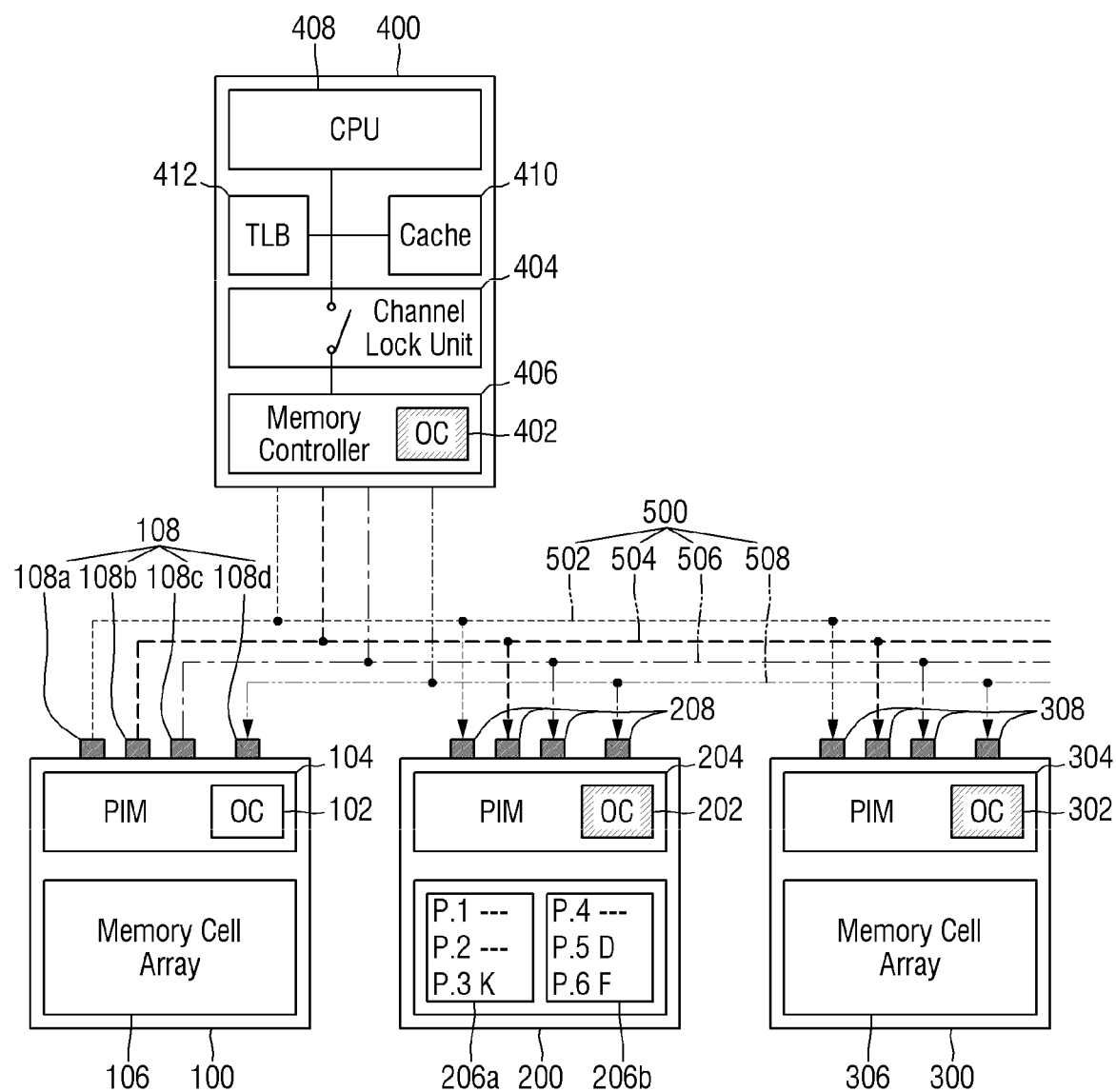
FIG. 6 is a block diagram of a memory system including a memory device having an input-output port according to some example embodiments of the present application.

FIG. 6 is a block diagram of the memory system including a memory device having an input-output port according to some example embodiments of the present application.

In some example embodiments of the present application, the channel 500 may include a command channel 502, a chip-select channel 504, an address channel 506 and/or a data channel 508. Each of the command channel 502, the chip-select channel 504, the address channel 506 and/or the data channel 508 may be a passage for transmitting command information, address information, chip-select information or data information. In some example embodiments, the command information may include "read", "write" or "erase". The address information may include "block address" or "page address". The chip-select information may include "information for specifying the memory device" (e.g., "second memory device"). The data information may include data stored in the memory cell arrays 106, 206 and/or 306. For example, in the instruction of "3. Read Third Page of Second Memory Device", the command information, chip-select information, address information, and data information may be "read", "second memory device", "third page", and/or "K", respectively In FIG. 6, the first memory device 100 may include a command information input-output port 108a, a chip-select information input-output port 108b, an address information input-output port 108c and/or a data information input-output port 108d for inputting or outputting the command information, the address information, the chip-select information and/or the data information. The command information input-output port 108a, the chip-select information input-output port 108b, the address information input-output port 108c, and/or the data information input-output port 108d of the memory device 100 may be connected to the command channel 502, the chip-select channel 504, the address channel 506, and/or the data channel 508, respectively. In some example embodiments, the command information input-output port 108a, the chip-select information input-output port 108b, the address information input-output port 108c, and/or the data information input-output port 108d of the memory device 100 may be constituted by the first input-output port 108. In some example embodiments, each of the command information input-output port 108a, the chip-select information input-output port 108b, the address information input-output port 108c, and/or the data information input-output port 108d of the memory device 100 may be constituted by separate output ports. In addition, the second and third memory devices 200 and 300 may include second and third input-output ports 108 including the command information input-output port, the chip-select information input-output port, the address information input-output port, and/or the data information input-output port.

In the memory system of FIG. 6, the host-authority control unit 402 of the host device 400 does not have the operational authority of the channel 500, and the channel lock unit 404 of the host device 400 may set a lock. Also, the first memory-authority control unit 102 of the first memory device 100 may have operational authority of the channel 500. The memory device 100 may control the data flow of other memory devices (e.g., the second and/or third memory devices 200 and/or 300) connected to the channel 500. For example, the data flow of the second memory device 200 may include command information, address information, chip-select information, and/or data information that are output from the first input-output port 108 of the first memory device 100 and are input to the second input-output port 208 of the second memory device 200. In addition, the data flow of the second memory device 200 may include data information that is output from the second input-output port 208 of the second memory device 200 and is input to the first input-output port 108 of the first memory device 100.

Hereinafter, the garbage collection operation executed in the memory system according to the embodiment of the present application will be described referring to FIGS. 7 to 9.

Figure 7:
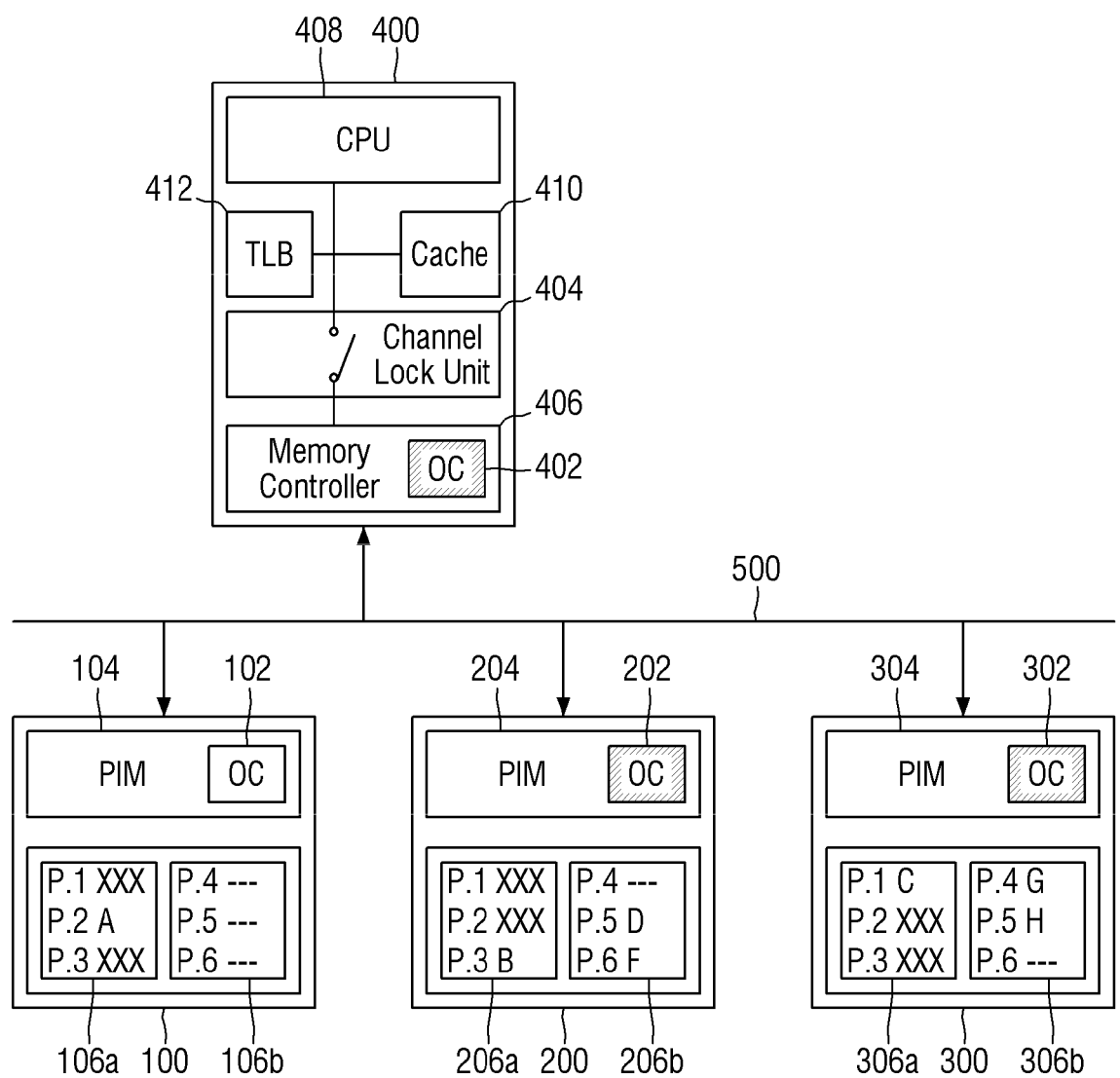
FIG. 7 is a diagram illustrating a garbage collection operation performed by the memory system according to some example embodiments of the present application.

FIG. 7 is a diagram illustrating the garbage collection operation executed by the memory system according to some example embodiments of the present application. Specifically, FIG. 7 illustrates the memory system before the garbage collection is performed, according to some example embodiments of the present application. The garbage collection is a series of operations in which, when most of the specific blocks in the memory cell array are filled with garbage, after shifting the data remaining in the specific blocks to another block, the specific blocks are removed. In the memory cell array of the memory device according to some example embodiments, data may be read or written in page units and may be erased in block units. In other words, the memory cell array may not be erased in page units. Therefore, if most pages of the specific block are filled with garbage, in order to erase garbage, it may be necessary to erase the whole specific blocks. Before erasing the specific blocks, it is necessary to store the data of some pages remaining in the specific block on the page of another block.

For example, in FIG. 7, the first and third pages P1 and P3 of the first block 106a of the first memory cell array 106 of the first memory device 100 may be filled with garbage "XXX". The first and second pages P1 and P2 of the first block 206a of the second memory cell array 206 of the second memory device 200 may be filled with the garbage "XXX". The second and third pages P2 and P3 of the first block 306a of the third memory cell array 306 of the third memory device 300 may be filled with the garbage "XXX". In order to erase the first block 106a of the first memory cell array 106, the first block 206a of the second memory cell array 206, and/or the first block 306a of the third memory cell array 306, it may be necessary to shift the data A, B and/or C remaining in the block to another block.

FIG. 8 is a diagram illustrating instructions for executing the garbage collection operation according to some example embodiments of the present specification. Specifically, FIG. 8 illustrates a series of instructions for performing the garbage collection according to some example embodiments of the present disclosure. A series of instructions illustrated in FIG. 8 are as follows.

"Instructions:
1. Read First Memory Device Second Page
2. Write First Memory Device Fourth Page
3. Read Second Memory Device Third Page
4. Write First Memory Device Fifth Page
5. Read Third Memory Device First Page
6. Write First Memory Device Sixth Page
7. Erase First Memory Device First Block
8. Erase Second Memory Device First Block
9. Erase Third Memory Device First Block"

When the instructions are executed in FIG. 8, in the memory system illustrated in FIG. 7, the data "A" of the second page P2 of the first memory device may be shifted to the fourth page P4 of the first memory device, the data "B" of the third page P3 of the second memory device may be shifted to the fifth page P5 of the first memory device, and the data "C" of the first page P1 of the third memory device may be shifted to the sixth page P6 of the first memory device. Also, the first block 106a of the first memory device, the first block 206a of the second memory device and the first block 306a of the third memory device may be erased.

Figure 9:
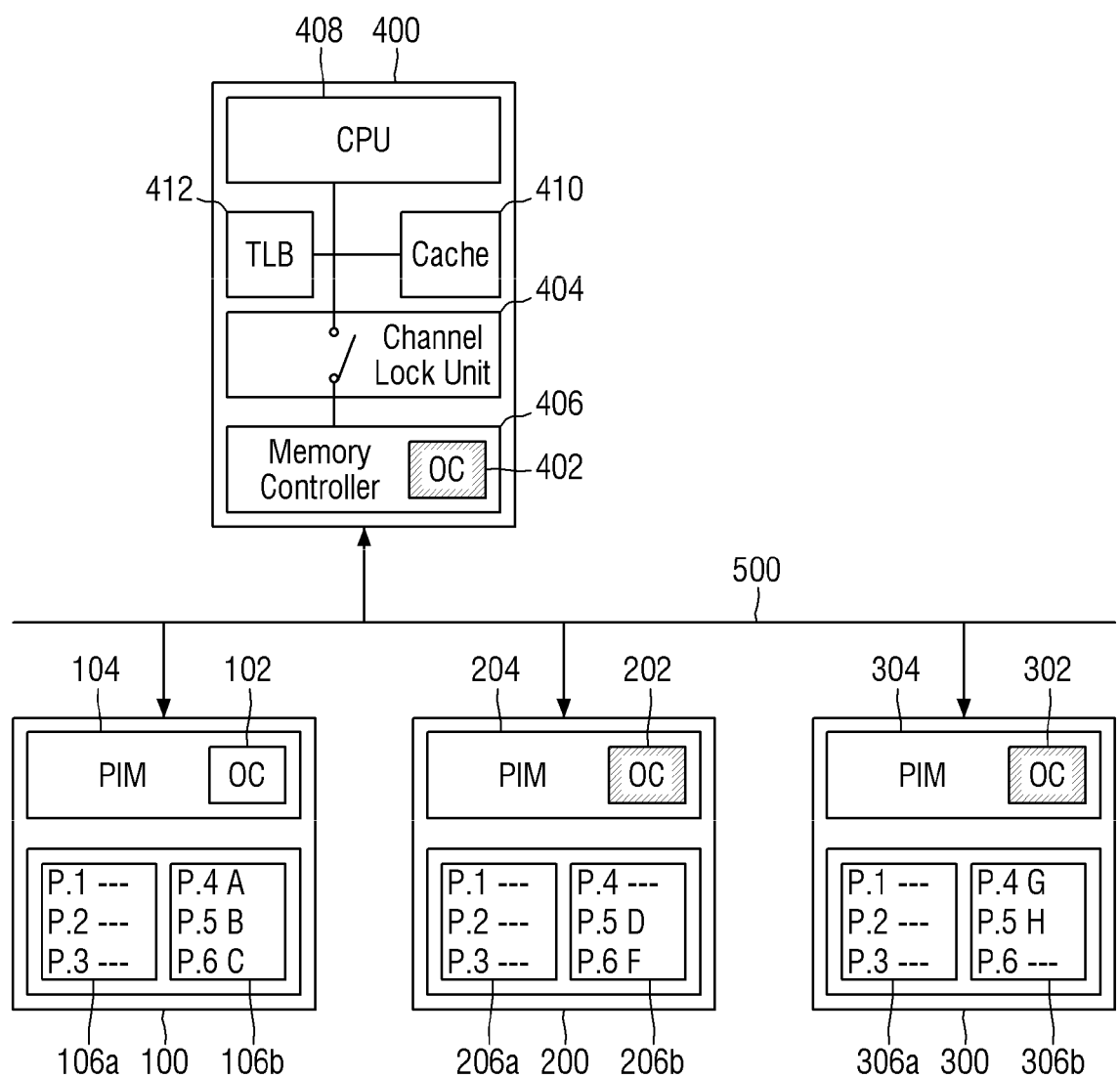
FIG. 9 is a diagram illustrating the garbage collection operation performed by the memory system according to some example embodiments of the present application.

FIG. 9 is a diagram illustrating the garbage collection operation performed by the memory system according to some example embodiments of the present application. Specifically, FIG. 9 illustrates the memory system after performing the garbage collection, according to some example embodiments of the present application. In the memory system of FIG. 9, the first block 106a of the first memory device, the first block 206a of the second memory device and the first block 306a of the third memory device may be erased, and may be filled with a blank.

Hereinafter, the effects of the memory system according to some example embodiments of the present application will be described with reference to FIGS. 8, 10, and 11.

Figure 10:
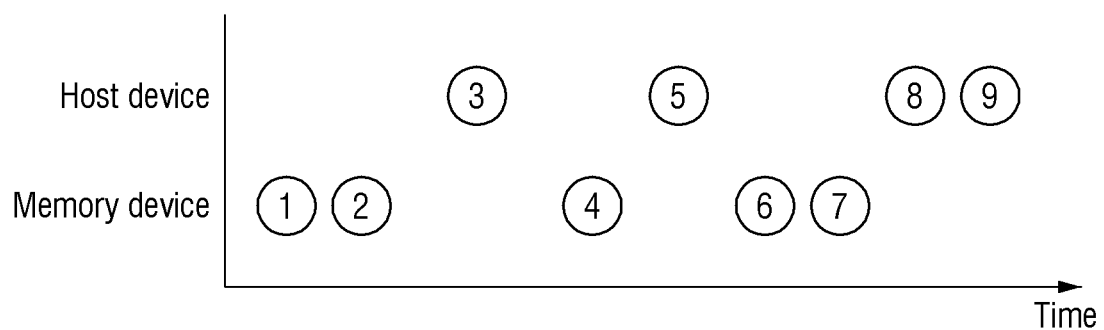
FIGS. 10 and 11 are diagrams illustrating the effect of the memory system according to some example embodiments of the present application.
Figure 11:
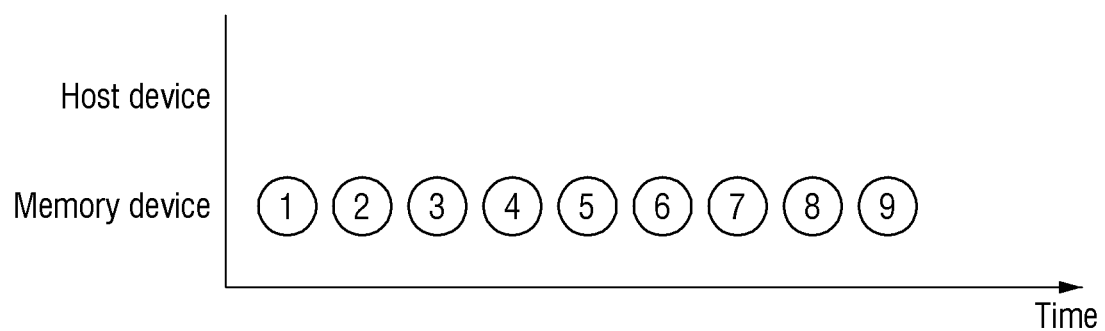

FIGS. 10 and 11 are diagrams illustrating the effects of the memory system according to some example embodiments of the present application. FIG. 10 is a diagram illustrating instructions to be executed by each of the host device and the memory device, when a series of instructions of FIG. 8 are executed in the memory system in which data movement may not be directly executed between the memory devices. FIG. 11 is a diagram illustrating instructions executed by each of the host device and the memory device when the garbage collection is executed, in the memory system according to some example embodiments of the present application. In FIGS. 10 and 11, a circle-number indicates that the instructions illustrated in FIG. 8 are executed. Also, a horizontal axis of the graph indicates the order (time), and a vertical axis of the graph indicates whether a subject of execution of the specific instruction is a host device or a memory device. For example, "③" in FIG. 10 indicates that the instruction of "3. Read Second MD Third Page" illustrated in FIG. 7 is executed by the host device.

Specifically, the memory system of FIG. 10 may not be able to directly execute the data movement between the memory devices. In other words, in the memory system of FIG. 10, data movement between the memory devices may not be executed without intervention of host device. For example, "1. Read First Memory Device Second Page" or "2. Write First Memory Device Fourth Page" illustrated in FIG. 8 may be executed by the first memory processor of the first memory device. However, the "3. Read Second Memory Device Third Page" illustrated in FIG. 8 may not be executed by the first memory processor of the first memory device, but may be executed by the host device.

Referring to FIG. 10, when the garbage collection is executed in the memory system in which direct communication between the memory devices is not possible, the first memory processor of the first memory device may execute the instructions (①, ②, ④, ⑥, and ⑦) on the memory devices. Also, the host device may execute the instructions (③, ⑤, ⑧ and ⑨) on other memory devices. Thus, in the memory system in which direct communication between the memory devices is not possible, intervention of the host device may be relied upon for controlling the data flow of the other memory systems connected to the channel. On the other hand, when the host device executes other tasks, processing of instructions (③, ⑤, ⑧ and ⑨) on the garbage collection may be delayed, which may delay the time at which the whole garbage collection is executed.

Specifically, the memory system of FIG. 11 is a memory system according to some example embodiments of the present application, and may directly move data between the memory devices. That is, in the memory system of FIG. 11, the memory processor of the memory device may control the data flow of the other memory systems connected to the channel. For example, the memory processor of the memory device may execute the instructions of "1. Read First Memory Device Second Page" or "2. Write First Memory Device Fourth Page" illustrated in FIG. 8, as well as "3. Read Second Memory Device Third Page".

As illustrated in FIG. 11, when the garbage collection is executed in the memory system according to some example embodiments of the present disclosure, the memory processor may execute the instructions (①, ②, ④, ⑥, and ⑦) on the memory device, and the instructions (③, ⑤, ⑧ and ⑨) on other memory devices connected to the channel. Therefore, in the memory system according to some example embodiments of the present application, the memory processor may execute instructions on other memory devices connected to the channel, without intervention of the host device. Also, the host device may execute other tasks other than garbage collection independently from the memory processor. Furthermore, since the memory processor executes the garbage collection process without intervention of the host device, the memory processor is not influenced by the task processing delay of the host device.

That is, in the memory system according to some example embodiments of the present application, the memory processor of the memory device seizes the memory channel without intervention of the host device, and may control the data flow of other memory devices connected to the channel. Thus, the memory processor may execute tasks such as data movement between the memory devices connected to the channel, without influence due to the host device (e.g., delay due to the host device).

Hereinafter, a wear-leveling operation executed in the memory system according to some example embodiments of the present application will be described with reference to FIGS. 12 and 13.

Figure 12:
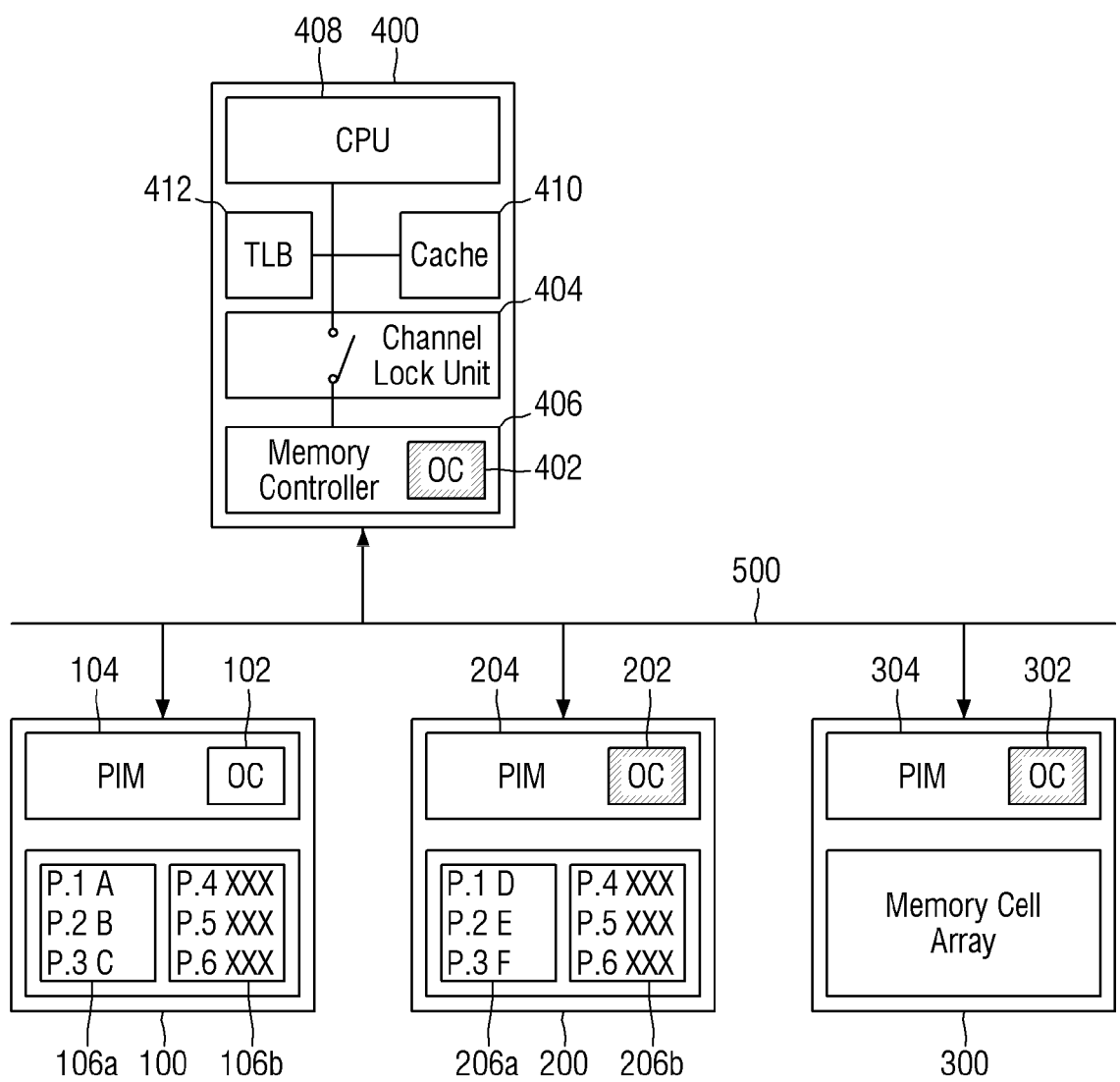
FIG. 12 is a diagram illustrating a wear-leveling operation performed by the memory system according to some example embodiments of the present application.

FIG. 12 is a diagram illustrating the wear-leveling operation of the memory system according to some example embodiments of the present application. Specifically, FIG. 12 illustrates a memory system before the wear-leveling according to some example embodiments of the present application is executed. In some example embodiments, the memory device may be a storage-class memory device. In FIG. 12, data "A", "B", and "C" are stored in the first page, the second page, and the third page of the first memory device 100, respectively. Also, the data "D", "E", and "F" are stored in the first page, the second page, and the third page of the second memory device 200, respectively.

FIG. 13 is a diagram illustrating the effect of the memory system in some example embodiments of the present application. Specifically, FIG. 13 illustrates the number of writes on specific data according to execution of wear-leveling in some example embodiments of the present specification.

Wear-leveling is a task of changing the memory position of specific data to flatten the cumulative number of writes when the number of writes of specific data cell increases. In some example embodiments, the data cells of the memory cell array of the memory device may not be written for a predetermined number of writes or more. If the number of writes of the data cells exceeds a predetermined number of writes, pages and/or blocks containing those data cells may no longer be available. Therefore, in the case where the number of writes of a specific data cell increases, wear-leveling for changing the position of the data cell storing the specific data may be executed. In some example embodiments, when data of high demand is stored on a specific page, the number of writes of the specific page may be greater than the number of writes of other pages. In this case, an operation of moving the data of high demand to another page in which the number of writes is small may be executed.

Figure 13A:
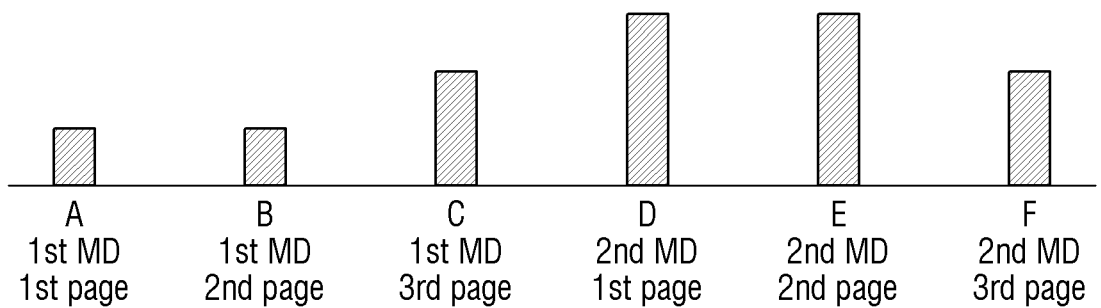
FIG. 13A-13C are diagrams illustrating the effect of the memory system in some example embodiments of the present application.
Figure 13B:
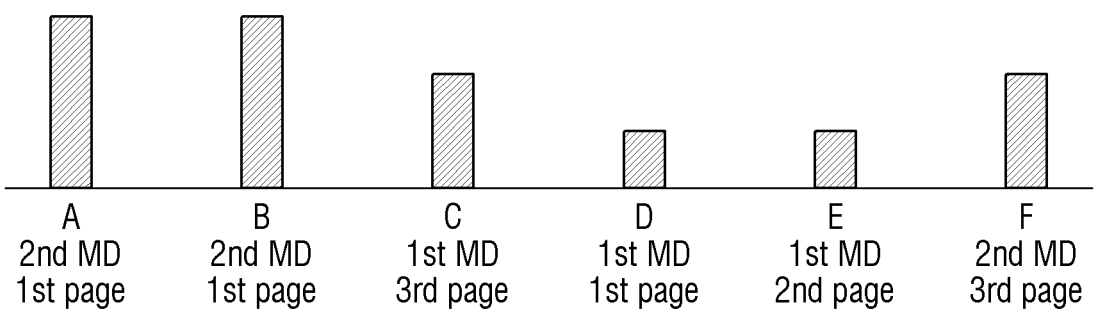
Figure 13C:
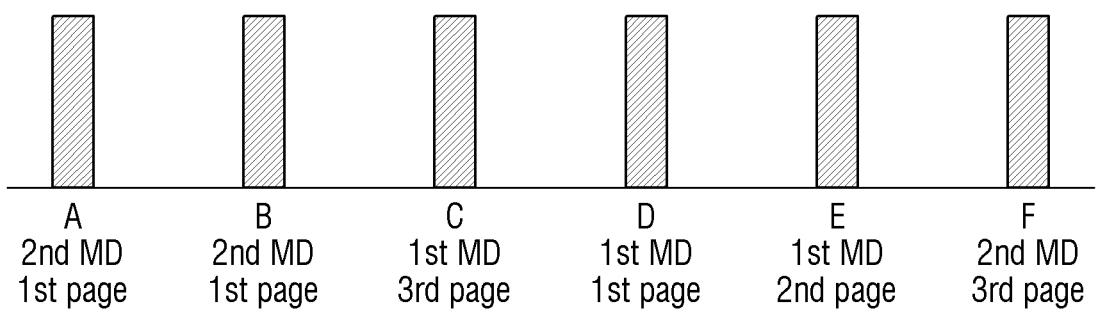

FIGS. 13A-13C illustrate the cumulative number of writes on data "A" to "F" illustrated in FIG. 12. Further, FIGS. 13A-13C illustrate addresses of pages in which data "A" to "F" are stored. Hereinafter, for convenience of explanation, it is assumed that the demand for data "A" and "B" is small, the demand for data "C" and "F" is normal, and the demand for data "D" and "E" is large.

FIG. 13A illustrates the cumulative number of writes before the wear-leveling is executed. In FIG. 13A, the data "A" to "F" may be stored in the first to third pages of the first memory device 100 and the first to third pages of the second memory device 200. At a specific time, the cumulative number of writes on the data "A" and "B" may be small, the cumulative number of writes on the data "C" and "F" may be normal, and the cumulative number of writes on the data "D" and "E" may be large.

FIG. 13B illustrates the cumulative number of writes on the data "A" to "F" after the wear-leveling is executed. By the wear-leveling, the positions of the data "A" and "B" and the data "D" and "E" may be exchanged. That is, in FIG. 13B, the data "A" and "B" may be stored on the first and second pages of the second memory device, and the data "D" and "E" may be stored on the first and second pages of the first memory device. Therefore, in FIG. 13B, the cumulative number of writes on data the "A" and "B" may be exchanged with the cumulative number of writes on the data "D" and "E".

FIG. 13C illustrates the cumulative number of writes on the data "A" to "F" after a certain period of time has elapsed after the wear-leveling operation was executed. As defined earlier, since the demand for the data "A" and "B" is small, and the demand for the data "D" and "E" is large, when a certain time elapses, the cumulative number of writes on the data "A" to "F" may be flattened as illustrated in FIG. 13C.

In this way, in order to execute the wear-leveling between the memory devices, it is necessary to perform data movement between the memory devices. In the conventional memory systems, intervention of the host device was relied upon for moving data between the memory devices.

However, in the memory system according to some example embodiments of the present application, the memory processor may move data between the memory devices without intervention of the host device. Therefore, the memory processor may execute the wear-leveling between the memory devices without influence of the host device (for example, delay due to the host device). Furthermore, the host device may execute other tasks while the memory processor of the memory device executes the wear-leveling. For example, the core processor of the host device may be utilized as a resource for other tasks.

Hereinafter, a memory system according to some example embodiments of the present application will be described with reference to FIG. 14.

Figure 14:
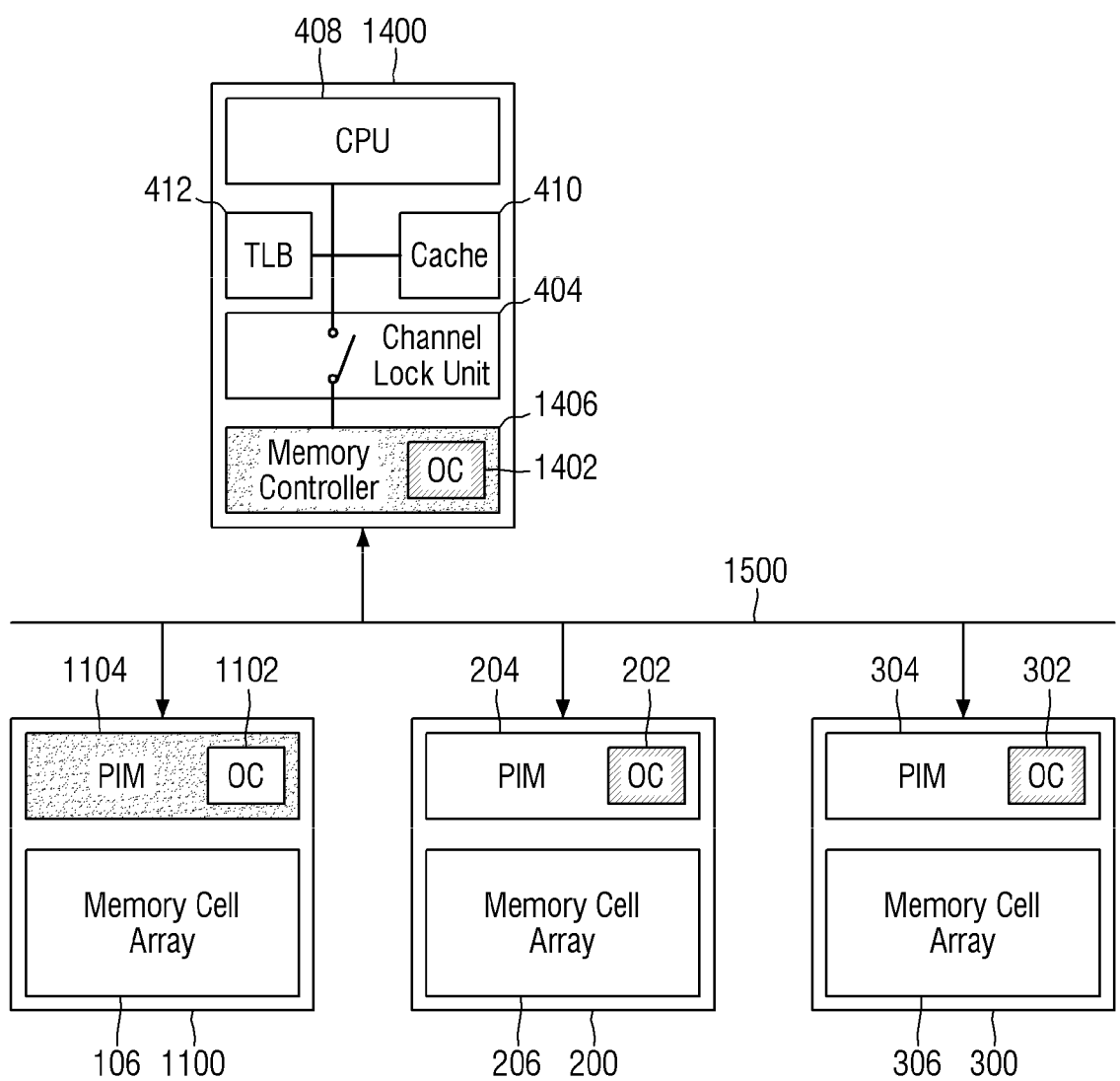
FIG. 14 is a block diagram of a memory system, in which the memory processor of the memory device utilizes the memory controller of the host device, according to some example embodiments of the present application.

FIG. 14 is a block diagram of a memory system according to some example embodiments of the present application, in which the memory processor of the memory device utilizes the memory controller of the host device. Hereinafter, differences from the above-described example embodiments will be mainly described.

The memory system according to some example embodiments of the present application may include a first memory device 1100 and/or a host device 1400 connected by a channel 1500.

The first memory device 1100 may include a first memory processor 1104. When the first memory-authority control unit 1102 of the first memory device 1100 has the operational authority of the channel 1500, the first memory processor 1104 may control the data flow of other memory devices 200 and/or 300.

The host device 1400 may include a memory controller 1406. When the host-authority control unit 1402 of the host device 1400 does not have the operational authority of the channel 1500, the channel lock unit 404 may set a lock between the core processor 408 and the memory controller 1406. At this time, the memory controller 1406 of the host device 1400 may execute a series of instructions received from the memory processor 1104 of the first memory device 1100. A series of instructions received by the memory controller 1406 from the memory processor 1104 of the first memory device 1100 may include control-instructions for controlling the data flow of the second and/or third memory device 200, 300 connected to the channel 1500. That is, the first memory processor 1104 of the first memory device 1100 may use the memory controller 1406 of the host device 1400, when controlling the data flow of the second and/or third memory device 200, 300.

In some example embodiments, the calculation processing capacity of the memory processor 1104 of the first memory device 1100 may be lower than the calculation processing capacity of the memory controller 1406 of the host device 1400. For example, if the state of the channel 1500 of the memory system is not good, the analog signal transferred through the channel 1500 may deteriorate. In this case, the task of analyzing and compensating for the deteriorated analog signal may be executed. In this manner, an undesired high amount of resources may be required for the analog signal processing task. In some example embodiments, it may be difficult for the first memory processor 1104 of the first memory device 1100 to perform the processing task of the analog signals. Therefore, by utilizing the resources of the memory controller 1406 of the host device 1400, the first memory processor 1104 may compensate for the low calculation processing capacity.

Hereinafter, the operation of the memory device and the host device in the memory system according to some example embodiments of the present application will be described with reference to FIGS. 15 and 16.

Figure 15:
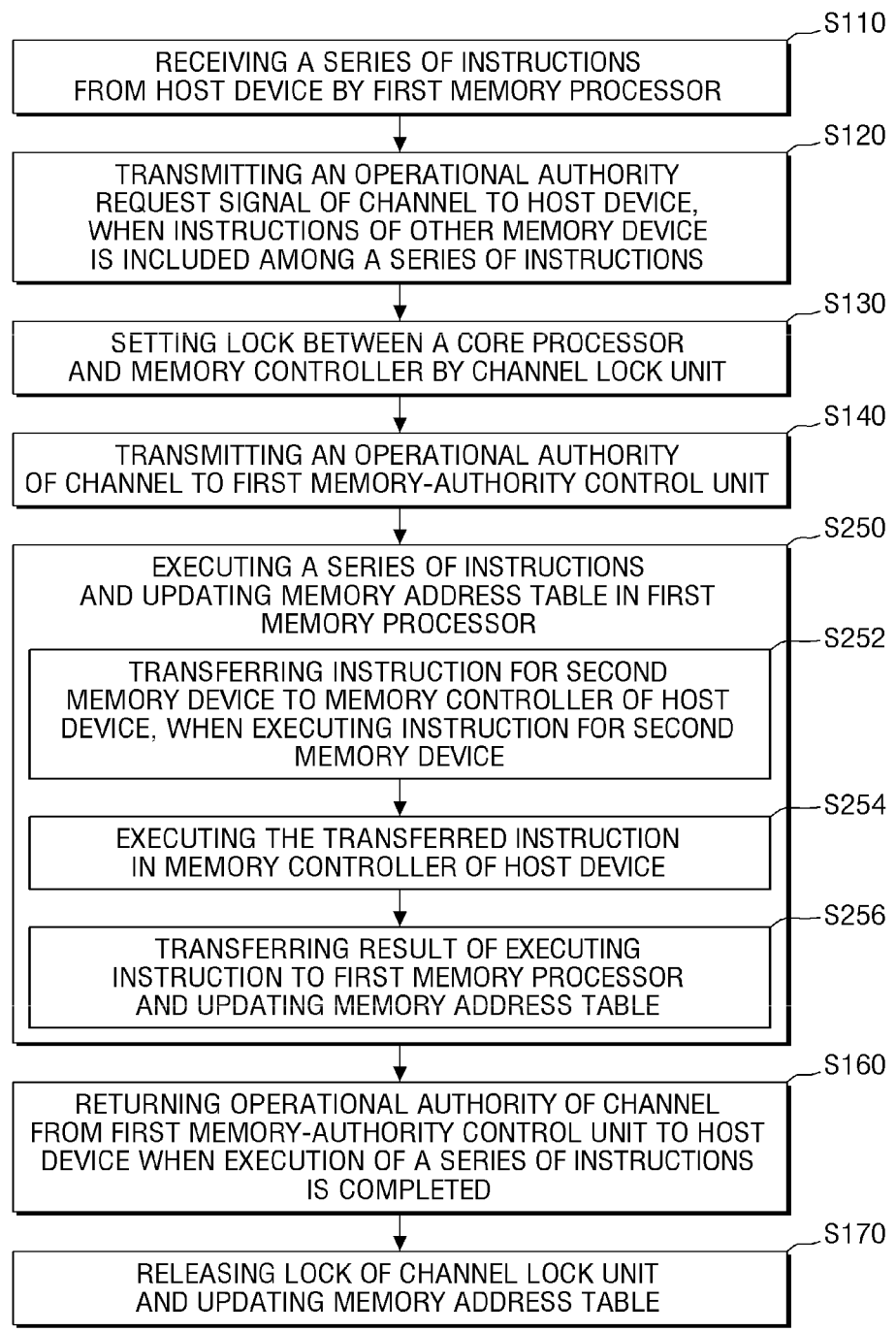
FIG. 15 is a flowchart illustrating the operation of the memory device and the host device in the memory system according to some example embodiments of the present application.
Figure 16:
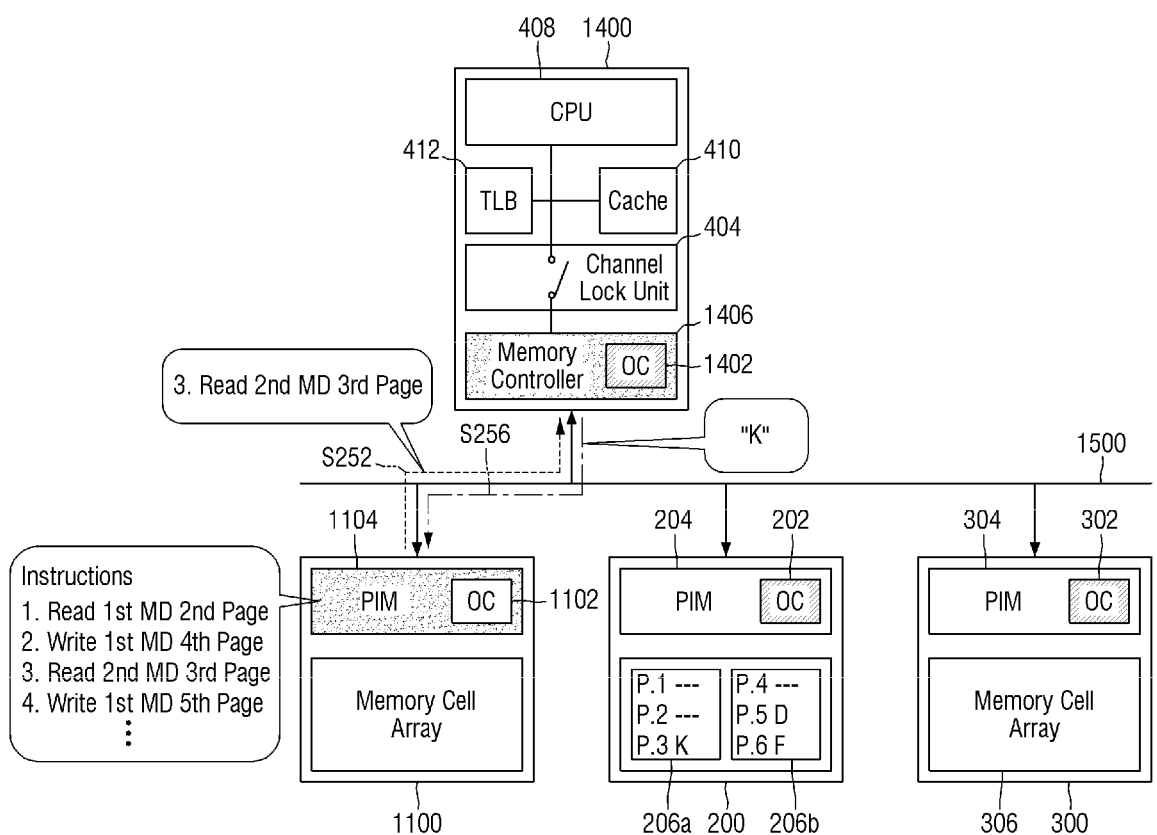
FIG. 16 is a diagram illustrating the operations of S252 to S256 of FIG. 15.

FIG. 15 is a flowchart illustrating the operation of the memory device and the host device in the memory system according to some example embodiments of the present application. FIG. 16 is a diagram illustrating the operation of S252 to S256 of FIG. 15. Hereinafter, differences from the above-described example embodiments will be mainly described.

Referring to FIG. 15, a series of instructions may be executed to update the memory address table in the first memory processor (S250). Specifically, for example, referring to FIG. 16, the first memory processor 1104 of the first memory device 1100 may execute a series of instructions received from the host device 1400 (S250).

Next, referring to FIG. 15, when executing the instruction of the second memory device, the memory processor may transfer the instruction on the second memory device to the memory controller of the host device (S252). Specifically, for example, referring to FIG. 16, the first memory processor 1104 may transmit an instruction (for example, "3. Read Second Memory Device, Third Page") on another memory device among a series of instructions, which are received from the host device 1400, to the memory controller 1406 of the host device 1400 (S252).

Next, referring to FIG. 15, the memory controller of the host device may execute the transferred instruction (S254). Specifically, for example, referring to FIG. 16, the memory controller 1406 of the host device 1400 may execute the received instruction (S254). For example, the memory controller 1406 may read the data "K" of the third page of the second device 200.

Next, referring to FIG. 15, the memory controller may transfer the result of instruction execution to the first memory processor. The first memory processor may update the memory address table (S256). Specifically, for example, referring to FIG. 16, the memory controller 1406 of the host device 1400 may transfer the result of the instruction execution (for example, data "K") to the first memory processor 1104 (S256). The first memory processor 1104 may update the memory address table when completing the execution of a series of instructions received from the host device 1400.

Hereinafter, the memory system according to some example embodiments of the present application will be described referring to FIG. 17.

Figure 17:
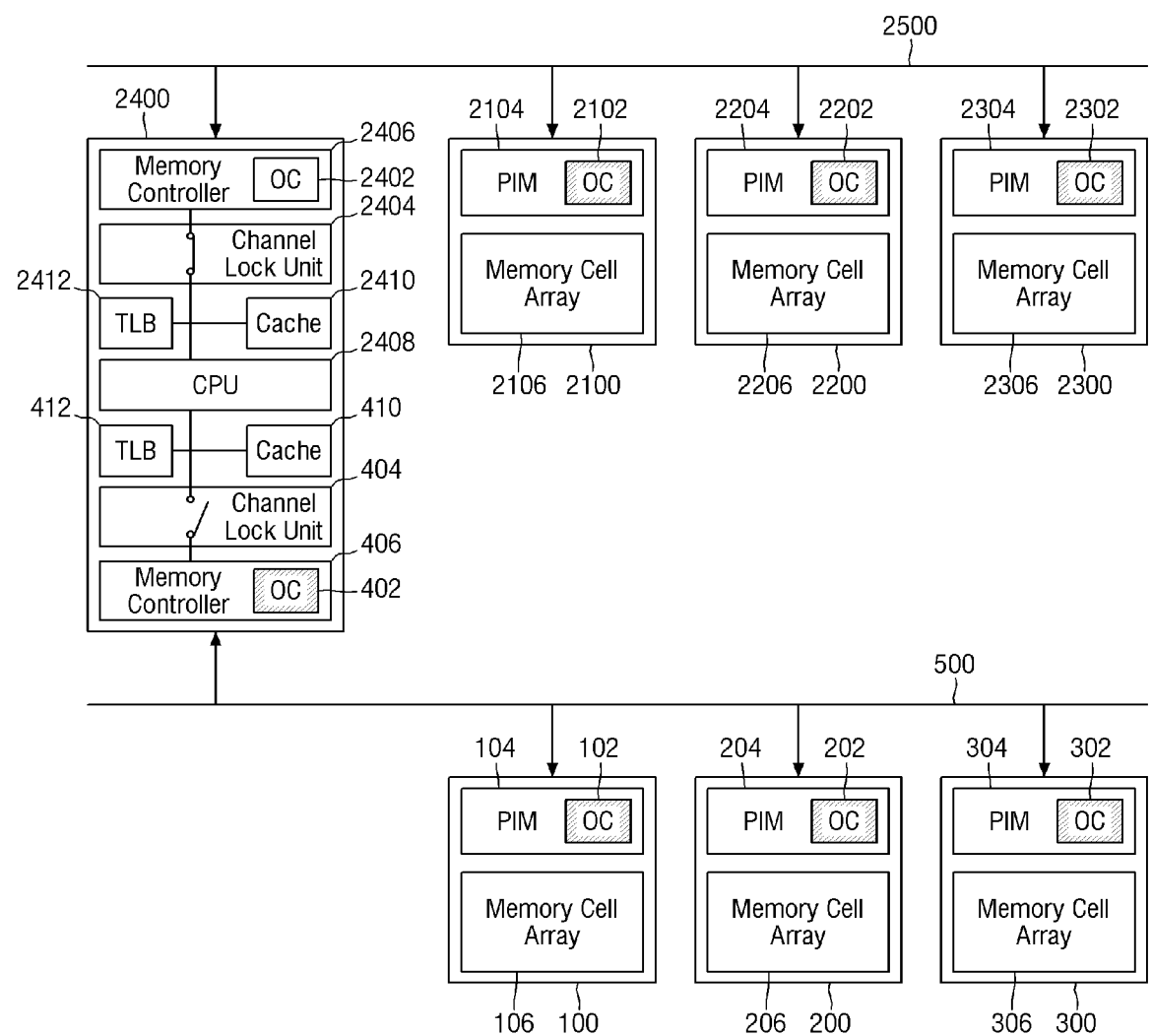
FIG. 17 is a block diagram of a memory system having two channels, according to some example embodiments of the present application.

FIG. 17 illustrates a memory system having two channels according to some example embodiments of the present application. The memory system according to some example embodiments of the present application may include a host device 2400, first to third memory devices 100, 200 and 300 connected to the first channel 500, and/or fourth to sixth memory devices 2100, 2200 and 2300a connected to the second channel 2500.

The host device 2400 may include a host-authority control unit which controls the operational authority of the first channel 500 and/or the operational authority of the second channel 2500. The host-authority control unit may include a first host-authority control unit 402 for controlling the operational authority of the first channel 500, and/or a second host-authority control unit 2402 for controlling the operational authority of the second channel 2500. That is, the host-authority control unit of the host device 2400 may be the first host-authority control unit 402 and the second host-authority control unit 2402 separated from each other, or may be a single host-authority control unit. The host device 2400 may include a first channel lock unit 404 for blocking the data flow from the host device 2400 to the first channel 500, and/or a second channel lock unit 2404 for blocking the data flow from the host device 2400 to the second channel 2500. The host device 2400 may include a first memory controller 406 for controlling the data flow of the first to third memory devices 100, 200 and 300 connected to the first channel 500, and/or a second memory controller 2406 for controlling the data flow of the first to third memory devices 2100, 2200 and 2300 connected to the second channel 2500. The host device 2400 may include a core processor 2408. The host device 2400 may include a first cache 410 and/or a first TLB 412 connected to the core processor 2408 and/or the first memory controller 406. Also, the host device 2400 may include a second cache 2410 and/or a second TLB 2412 connected to the core processor 2408 and/or the second memory controller 2406. The functions of the second cache 2410 and the second TLB 2412 of the host device 2400 may be the same as the functions of the first cache 410 and the first TLB 412 described in FIG. 1.

The fourth to sixth memory devices 2100, 2200 and 2300 may include fourth to sixth memory-authority control units 2102, 2202 and 2302, fourth to sixth memory processors 2104, 2204 and 2304, and/or fourth to sixth memory cell arrays 2106, 2206 and 2306, respectively. The functions of the fourth to sixth memory-authority control units 2102, 2202 and 2302, the memory processors 2104, 2204 and 2304 and the memory cell arrays 2106, 2206 and 2306 of the fourth through sixth memory devices 2100, 2200 and 2300 may be the same as the functions of the memory-authority control units 102, 202 and 302, the memory processors 104, 204 and 304 and the memory cell arrays 106, 206 and 306 of the first through third memory devices 100, 200 and 300 of FIG. 1. For example, the memory-authority control units 2102, 2202 and/or 2302 of the fourth to sixth memory devices 2100, 2200 and/or 2300 connected to the second channel 2500 or the second host-authority control unit 2402 of the host device 2400 may exclusively have the operational authority of the second channel 2500.

Referring to FIG. 17, the memory system according to some example embodiments of the present application may grant the operational authority of the first channel 500 to, for example, the first memory-authority control unit 102 of the first memory device 100. That is, the first memory-authority control unit 102 of the first memory device 100 may have the operational authority of the first channel 500, and may directly request the memory device 200 connected to the first channel 500 for data. The first channel lock unit 404 of the host device 2400 may set a lock which blocks the data flow from the host device 2400 to the first channel 500. The first memory processor 104 of the first memory device 100 may execute control-instructions for controlling the data flow of the second and/or third memory device 200, 300 connected to the channel.

The memory system according to some example embodiments of the present application may grant the operational authority of the second channel 2500 to, for example, the fourth memory device 2100. That is, the memory system may grant the operational authority of the second channel 2500 to the second host-authority control unit 2402 of the host device 2400. The second channel lock unit 2404 of the host device 2400 may release the lock for blocking the data flow from the host device 2400 to the second channel 2500. The second memory device 2406 of the host device 2400 may control the data flow of the fourth to sixth memory devices 2100, 2200 and 2300 connected to the second channel 2500. That is, the fourth memory processor 2104 of the fourth memory device 2100 may not control the data flow of other devices 2200 and/or 2300 connected to the second channel 2500.

In concluding the detailed description, those skilled in the art will appreciate that many variations and modifications may be made to the preferred embodiments without substantially departing from the principles of the present disclosure. Therefore, the disclosed preferred embodiments of the disclosure are used in a generic and descriptive sense only and not for purposes of limitation.

What is claimed is:

1. A memory device which is connected to a channel, comprising:
    a memory cell array and a memory processor, the memory processor configured to
      control an operational authority of the channel,
      control data flow of a plurality of other memory devices connected to the channel,
      execute a series of instructions received from a host device connected to the channel, the series of instructions including control-instructions for controlling the data flow of the plurality of other memory devices,
      maintain a memory address table having a data address of a memory cell array of each of the plurality of other memory devices,
      detect changes made to the data address of the memory cell array of the plurality of other memory devices from execution of the series of instructions,
      update the memory address table as an updated memory address table, and
      transmit the updated memory address table to the host device, at a time when the memory processor transmits the operational authority of the channel to the host device.

2. The memory device of claim 1, wherein the memory processor is further configured to revoke the operational authority of the channel from a host device connected to the channel and the plurality of other memory devices.

3. The memory device of claim 1, wherein the control-instructions for controlling the data flow of the plurality of other memory devices includes reading, writing, or erasing data of a memory cell array of at least one of the plurality of other memory devices.

4. The memory device of claim 1, wherein the memory processor is further configured to
    make a determination as to whether the series of instructions received from the host device includes the control-instructions for controlling the data flow of at least one of the plurality of other memory devices, and
    transmit a channel operational authority request signal to the host device based on the determination.

5. The memory device of claim 1, wherein the memory processor is further configured to
    make a determination as to whether the series of instructions has been executed by the memory processor, and
    transmit the operational authority of the channel to the host device based on the determination.

6. The memory device of claim 1, further comprising an input-output port that inputs or outputs command information, address information, chip-select information, or data information.

7. The memory device of claim 6, wherein the data flow of the plurality of other memory devices includes
    command information, address information, chip-select information, or data information which is output from the input-output port of the memory device and input to at least one of the plurality of other memory devices, or
    data information which is output from at least one of the plurality of other memory devices and input to the input-output port of the memory device.

8. A memory system comprising:
    a host device which is connected to a channel and includes,
      a cache,
      a memory address table, and
      a core processor configured to,
        control operational authority of the channel,
        determine when the host device has no operational authority of the channel,
        block data flow to the channel from the host device, and
        update the memory address table when the host device receives the operational authority of the channel from a memory device connected to the channel.

9. The memory system of claim 8, wherein when the host device has the operational authority of the channel, a plurality of memory devices connected to the channel has no operational authority of the channel.

10. The memory system of claim 8, wherein the core processor is further configured to set a lock which blocks data flow to the channel from the host device.

11. The memory system of claim 9, wherein the core processor is further configured to
    execute a series of instructions for at least one of a plurality of memory devices connected to the channel, and
    set a lock in order to control a data flow of the plurality of memory devices connected to the channel.

12. The memory system of claim 11, wherein the core processor is further configured to execute a series of instructions received from at least one of the plurality of memory devices, when the lock is set.

13. The memory system of claim 12, further comprising a first memory device connected to the channel, and a plurality of memory devices different from the first memory device connected to the channel, wherein the series of instructions includes control-instructions for controlling data flow of the plurality of memory devices different from the first memory device.

14. A memory system comprising:
    a host device which is connected to a first channel and a second channel which is different from the first channel, the host device including a cache, a memory address table, and a core processor configured to control operational authority of the first and second channels;
    first and second memory devices connected to the first channel; and
    a third memory device connected to the second channel, wherein the core processor is further configured to
grant operational authority of the first channel to the first memory device, and the first memory device directly requests the second memory device for data,
grant no operational authority of the second channel to the third memory device, and
update the memory address table when the host device receives the operational authority of the channel from the first, second, or third memory device.

15. The memory system of claim 14, wherein the core processor is further configured to block data flow from the host device to the first channel, and the first memory device further includes a first memory processor which is configured to execute control-instructions for controlling data flow of the second memory device.

16. The memory system of claim 8, wherein the core processor is further configured to flush the cache when the host device has no operational authority of the channel.

* * * * *